UNITED STATES PATENT OFFICE.

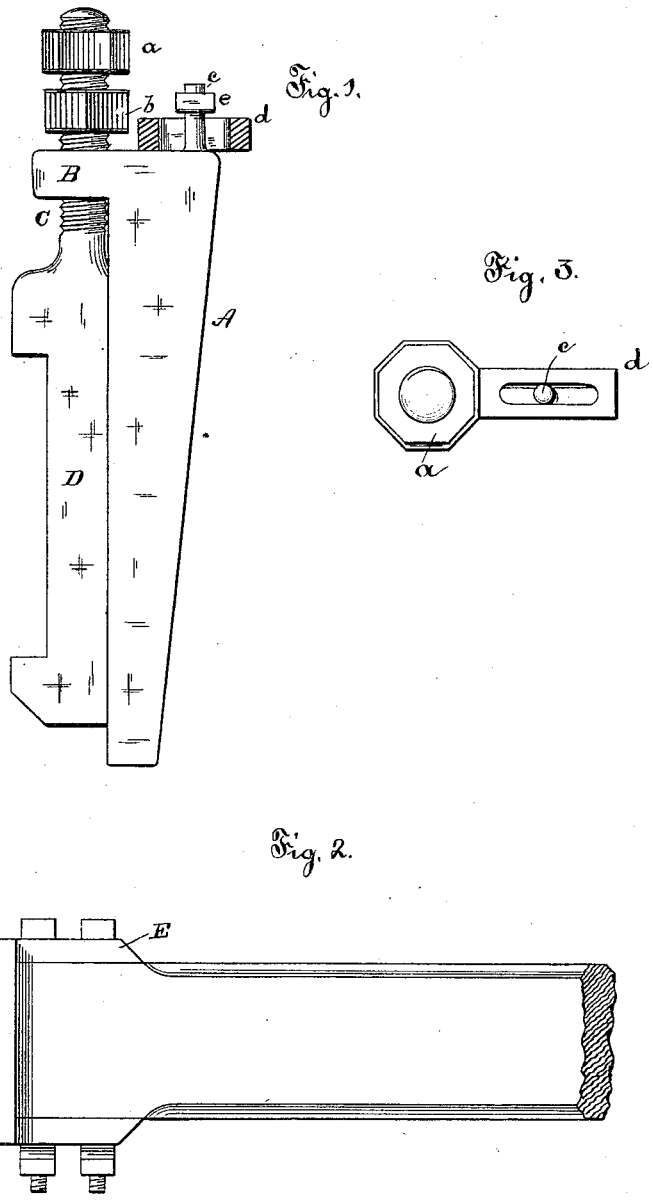

JOHN H. ROBISON, OF ST. JOE, PENNSYLVANIA, ASSIGNOR TO HIMSELF AND ALEX L. FRAZIER, OF SAME PLACE.

GIB AND KEY.

SPECIFICATION forming part of Letters Patent No. 351,127, dated October 19, 1886.

Application filed May 17, 1886. Serial No. 202,454. (No model.)

*To all whom it may concern:*

Be it known that I, JOHN H. ROBISON, of St. Joe, in the county of Butler and State of Pennsylvania, have invented a new and useful Improvement in Gibs and Keys, of which the following is a specification, reference being had to the annexed drawings, forming a part thereof, in which—

Figure 1 is a side elevation. Fig. 2 shows the application of the gib and key. Fig. 3 is a detail plan view of the nut and nut-lock.

Similar letters of reference indicate corresponding parts in both figures of the drawings.

Keys employed in adjusting connecting-rod boxes and other parts of machinery are commonly adjusted by tapping them in one direction or the other with a hammer, thereby battering the ends of the key and distorting it so that it does not bear evenly upon the surface with which it contacts, and rendering the adjustment of the boxes uncertain, thereby injuring the boxes and the journals or crank-pins which they inclose.

The object of my invention is to obviate this difficulty, and provide means for adjusting the key quickly and accurately without danger of injury to the key or to the parts in connection with which it is used.

My invention consists in a key provided with an eye at one edge of the wider end thereof, and in the combination therewith, of a gib provided with a threaded shank received in the eye of the key, and with a nut and jam-nut for forcing the key into its place, and for retaining it after adjustment.

It also consists in an auxiliary locking device for holding the nut in place after the key is adjusted.

The key A is provided with an eye, B, upon one edge of its wider end, for receiving the threaded shank C, formed on the end of the gib D. With the exception of the eye B and shank C the gib and key are of the usual form. Upon the threaded shank C of the gib D are placed two nuts, *a b*, the nut *b* serving to adjust the key, and the nut *a* acting as a jum-nut for preventing the loosening of the nut *b*. A screw-threaded stud, *c*, projects from the wider end of the key A and receives a slotted bar, *d*, which is placed in contact with the nut *b*, and secured in place by a nut, *e*, secured on the stud.

The gib D is applied to the strap E of the connecting-rod or other parts of the machinery requiring the gib and key in the usual way, and the nuts *a b* having been removed from the shank C the key A is placed behind the gib D, when the nuts *a b* are replaced, and the adjustment of the key is effected by turning the nut *b*, the nut *a* afterward being turned down upon the nut *b* to lock it on the shank, and thus hold the key A in place. The slotted bar *d* is applied in the manner above described as an additional safeguard.

Having thus described my invention, what I claim as new, and desire to secure by Letters Patent, is—

1. The combination, with the key A, provided with an eye, B, upon one edge of its wider end, of the gib D, provided with the threaded shank C, received in the eye B, and provided with nuts *a b*, substantially as herein shown and described.

2. The key A, provided with the eye B and the stud *c*, in combination with a gib having a threaded shank passed through the eye of the key and provided with a nut, the slotted bar *d*, and the nut *e* on the stud *c*, substantially as herein shown and described.

JOHN H. ROBISON.

Witnesses:
OLIVER GRAHAM,
FRANK KOHLER.